US005255974A

United States Patent [19]

Signer

[11] Patent Number: 5,255,974

[45] Date of Patent: Oct. 26, 1993

[54] STATIC MIXER

[75] Inventor: Arno Signer, Winterthur, Switzerland

[73] Assignee: Sulzer Brothers Limited, Winterthur, Switzerland

[21] Appl. No.: 754,739

[22] Filed: Sep. 4, 1991

[30] Foreign Application Priority Data

Sep. 19, 1990 [CH] Switzerland ........................ 03036/90

[51] Int. Cl.[5] ........................ B01F 5/06; F16L 55/00; F16L 9/00

[52] U.S. Cl. .................................... 366/336; 138/108; 138/109

[58] Field of Search ................. 138/37, 108, 109, 103; 285/55, 341, 382.7; 366/336, 337, 338

[56] References Cited

U.S. PATENT DOCUMENTS 2,216,846 10/1940 Lewis ........ 48/180
2,322,026 6/1943 Jaeckel ........ 366/336
2,457,633 12/1948 Borg ........ 285/341
3,167,305 1/1965 Backx ........ 366/340
3,294,426 12/1966 Lyon ........ 285/382.7
3,466,068 9/1969 Kreidel ........ 285/341
3,554,496 1/1971 Nusstein ........ 366/338
3,576,334 4/1971 Hemens ........ 285/341
3,722,925 3/1973 Robbins ........ 285/341
3,738,615 6/1973 Brasie ........ 259/4
3,782,694 1/1974 Shano ........ 366/340
4,008,911 2/1977 Kiyooka ........ 285/382.7
4,022,249 5/1977 de Putter ........ 138/103
4,073,479 2/1978 Kuhn et al. ........ 266/173
4,189,243 2/1980 Black ........ 366/336
4,302,550 11/1981 Pisavic ........ 366/336
4,414,184 11/1983 Pinkston ........ 366/336
4,522,504 6/1985 Greverath ........ 366/338
4,692,030 9/1987 Tausher ........ 366/336
4,783,319 11/1988 Habrich ........ 366/336
4,792,229 12/1988 Frohnert ........ 366/336
4,848,862 7/1989 Wolf ........ 285/382.7
4,896,972 1/1990 Ferrari ........ 366/340
4,907,725 3/1990 Durham ........ 366/336
4,936,689 6/1990 Federighi ........ 366/337
4,964,733 10/1990 Fredriksson et al. ........ 366/336
5,068,494 11/1991 Bolante ........ 285/341

FOREIGN PATENT DOCUMENTS 121342 10/1984 European Pat. Off. ........ 366/338
2642105 3/1978 Fed. Rep. of Germany .
2550309 2/1985 France .
0381932 11/1964 Switzerland .
2056871 3/1981 United Kingdom .

*Primary Examiner*—Harvey C. Hornsby
*Assistant Examiner*—Terrence R. Till
*Attorney, Agent, or Firm*—Kenyon & Kenyon

[57] ABSTRACT

The mixer is constructed of a steel tubular housing and a replaceable plastic tube. Mixing elements are mounted within the plastic tube and are secured in place by carrier and sealing rings at opposite ends of the tube and housing. Each carrier and sealing ring has an annular sealing surface to seal against an internal surface of the plastic tube while having an abutment surface for abutting the mixer elements in order to retain the mixer elements in place. End connections are provided to secure the rings in place and in abutment against the tubular housing.

17 Claims, 2 Drawing Sheets

STATIC MIXER

Figure 1:
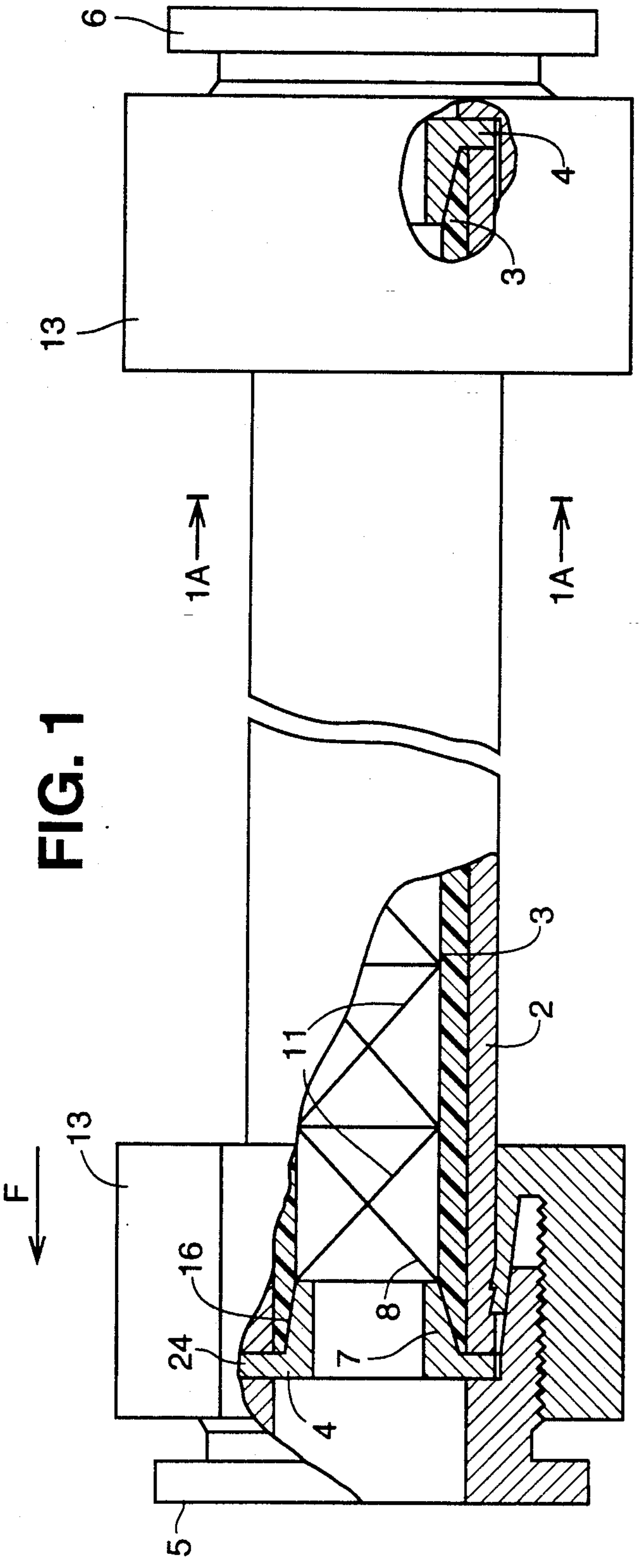

This invention relates to a static mixer. More particularly, this invention relates to a static mixer constructed of a tubular housing with one or more mixing elements disposed within the housing.

As is known, various types of static mixers have been used for continuously mixing, dispersing and homogenizing hardeners, additives, accelerators, reactors and dyes in resins, adhesives and sealants. With a low mixer weight and volume, it is possible to obtain good reproducibility of the mixed quality and minimum heat application. Mixing devices of this kind are known, for example, from Swiss Patent 642,564.

Particularly in the case of reactive materials which harden rapidly, however, a considerable problem is the fact that the material being mixed slowly adheres to the mixing elements, builds up, and finally clogs the mixer. The resulting narrowing of the mixing elements due to deposits also changes the mix properties, which are no longer reproducible. For example, if activated one-component adhesives, such as polyurethane, are processed with added moisture as an accelerator, high processing speeds are required with a high working pressure in the mixer and short reaction times. Prior art mixers cannot satisfy these requirements since they clog too rapidly, do not yield constant adhesive properties and are difficult to change and clean. Prior art mixers cannot therefore be used, particularly for rapid processing with robots. Since good mixers are relatively expensive and precision tools, they cannot easily be used as consumables.

Accordingly, it is an object of the invention to provide a mixer which allows high processing speeds with reactive material at a high degree of constancy and with good reproducibility.

It is another object of the invention to be able to disassemble and clean a static mixer in a rapid easy manner.

It is another object of the invention to provide a static mixer having a long life.

It is another object of the invention to provide a static mixer which can be continually re-used and readily and completely cleaned.

Briefly, the invention provides a static mixer comprised of a tubular housing, an interchangeable plastic tube slidably mounted coaxially in the housing and at least one mixing element slidably mounted in the plastic tube. In addition, a ring is removably mounted at each end of the tubular housing with an outer annular surface in sealing contact with an inner annular surface of the plastic tube and an end surface in abutment with an end of a mixing element in order to retain the mixing element or elements in the tube. Each ring thus functions as a carrier and sealing ring.

The plastic tube is formed of a material to which the media undergoing mixing within the mixing elements does not stick. Further, the interchangeable plastic tube allows easy dismantling of the mixer into the individual parts and, hence, simple cleaning and re-use of the mixer elements with a new plastic tube.

The annular sealing surface of the carrier and sealing ring serves to seal off the ring from the load-bearing tubular housing so that no reaction resin can pass between the housing and the plastic tube which might otherwise prevent the tube from being removed. The carrier and sealing ring abutment surface also serves to support the mixing elements with respect to the high pressure forces which usually occur during operation of the mixer.

The static mixer may also have a pair of end connections each of which is removably secured to a respective end of the tubular housing while being in abutment with a respective ring in order to secure the ring in place.

The annular sealing surface of each ring may be conical, preferably with an angle of taper of from 10° to 30°. This provides a simple and good sealing effect relative to the plastic tube. In other embodiments, the sealing surface may be roughened or may have fluting or grooves therein. Further, the annular surface may be provided with a helical screw thread for threading of the ring into the plastic tube.

The plastic tube may also have conically tapered ends, for example, each having a taper of from 10° to 30°. Further, the plastic tube is made of a material which is relatively soft so as to be fixed securely to the carrier and sealing ring, particularly, by means of a conical screw thread so that even high pressure forces do not impair the sealing action. The use of a taper at each end of the plastic tube provides a more intimate contact with the carrier and sealing ring upon assembly of the mixer.

The plastic tube may be made of a material such as a non-sticking polyolefin, such as polyethelene (PE) or polypropylene (PP) or may be provided with a surface layer, such as an inert surface layer of polytetrafluroethylene (PTFE), on an interior surface so that the tube can be readily removed from hardened resins and adhesives.

The plastic tube may also be provided with a longitudinal groove in order to define a zone of weakening and, thus, an intentional breakage point in order to facilitate separation after use.

The carrier and sealing ring may be made of metal so as to provide for a permanent connection which can be easily cleaned and reused.

The mixer elements which are used in the static mixer may be of any suitable type such as mixer elements having crossing webs as described, for example, in Swiss Patent 642,564 and known as Sulzer SMX Mixers.

Figure 1A:
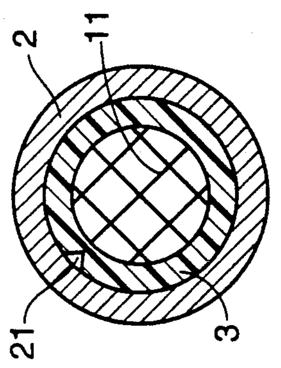

These and other objects and advantages of the invention will become more apparent from the following detailed description taken in conjunction with the accompanying drawings wherein:

FIG. 1 illustrates a partial cross-sectional view of a static mixer constructed in accordance with the invention;

FIG. 1*a* illustrates a cross-sectional view of the static mixer of FIG. 1 taken along the line A—A.

Figure 2:
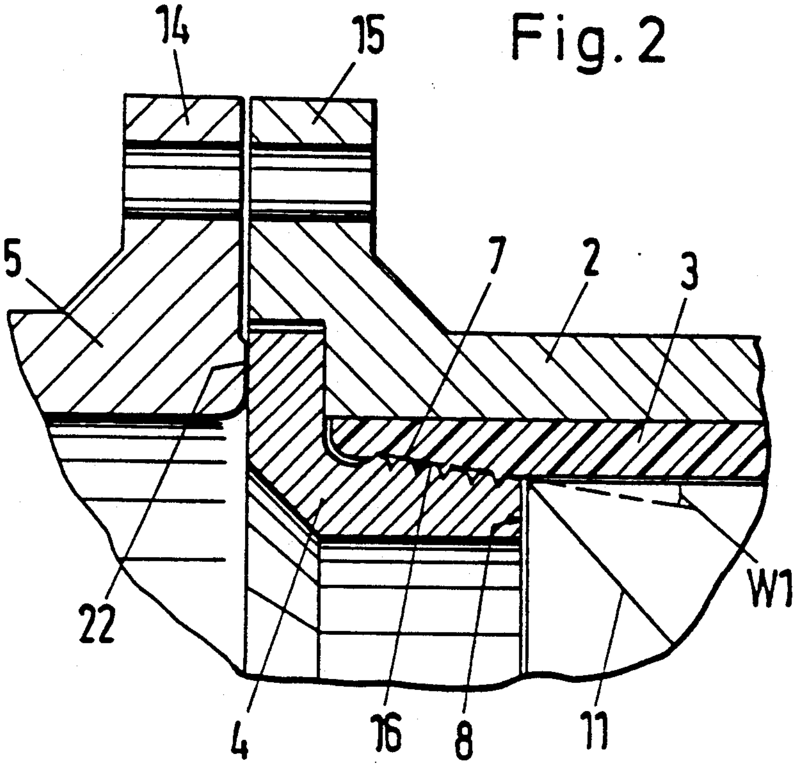
Figure 3:
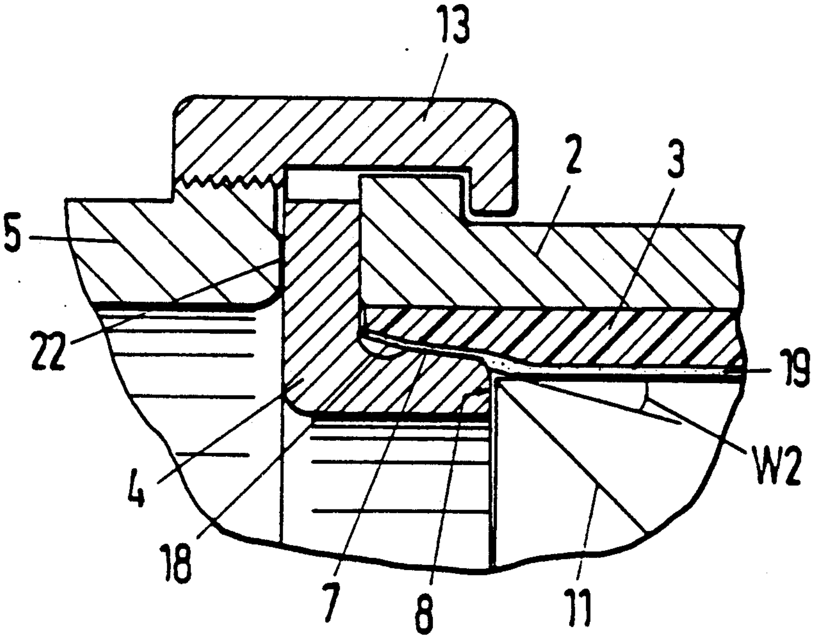

FIG. 2 illustrates a modified mounting arrangement for the plastic tube within a tubular housing in accordance with the invention; and FIG. 3 illustrates a further modified mounting arrangement for mounting a plastic tube in a tubular housing in accordance with the invention.

Referring to FIG. 1, the static mixer comprises a pressure-tight load bearing steel tube forming a tubular housing 2, an inserted interchangeable plastic tube 3 slidably mounted coaxially in the housing 2 and forming an inexpensive consumable item and a pair of rings which serve as carrier and sealing rings 4 in order to removably secure the plastic tube 2 in place. In addition, end connections 5, 6 are provided at opposite ends of the tubular housing 2 for connecting feed conduits and exit nozzles. Still further, a plurality of static mixing elements 11 are slidably mounted within the plastic tube 3 in order to perform a mixing operation as is well known.

The construction of the static mixer allows a simple and rapid assembly, dismantling, cleaning and re-use of the mixer. The function of the carrier and sealing rings 4 is of decisive importance in this connection. As indicated, each ring 4 has an outer annular surface 7 in sealing contact with an inner annular surface of the plastic tube 3. This sealing surface 7 is provided with a suitable configuration to allow intimate contact with the more flexible plastic tube 3. In addition, the ring 4 has an end abutment surface 8 in abutment with the end of a mixing element 11 within the plastic tube 3. Thus, the abutment surface 8 is able to take the higher pressure forces of the mixer elements, for example, 200 bar.

On assembly, the plastic tube 3 is slid into the tubular housing 2 and the rings 4 are fitted into place by being pushed into the plastic tube 3 or by being screwed into the plastic tube 3. As indicated, each ring 4 has a flange 24 for abutting against the end of the tubular housing 2 while each end connection 5 abuts against the flange on an opposite side. Suitable connecting elements, for example, in the form of clamping ring screw connections 13, are provided to secure the end connections 5, 6 in place. As indicated, as the connections 13 are tightened, a load-bearing connection is formed between the steel tube 2 and the end connections 5, 6 via the carrier and sealing rings 4. Thus, the plastic tube 3 no longer has to take high pressure forces.

The annular surface 7 of each ring 4 may be conical, for example having an angle of taper of from 10° to 30°. Referring to FIG. 2, wherein like references characters indicate like parts as above, depending on the type of plastic tube 3, the intimate contact between a sealing ring 4 and the tube 3 can be improved by providing a slight roughening 16 on the annular surface 7. Alternatively, the annular surface may be provided with fluting or grooves. Still further, the annular surface 7 may have a helical screw thread for threading into the plastic tube. Such a conical screw thread enables softer plastic tubes to be used. Further, the screw thread may be formed on a conical surface.

As indicated in FIG. 2, the plastic tube 3 may be provided with conically tapered ends, for example, each having an angle of taper W1 of from 10° to 30°.

As indicated, the connection between the tubular housing 2 and an end connection 5 may be enabled by means of flanges 14, 15 on the respective connection 5 and housing 2. In this case, a metal seal 22 is achieved between the sealing ring 4 and the end connection 5. The flow of medium in the direction of arrow F in FIG. 1 for mixing is thus sealed off from the outside and the plastic tube so as to be pressure-tight.

Referring to FIG. 3, wherein like reference characters indicate like parts as above, each end of the plastic tube 3 may be provided with an internal cone 18 which is pressed onto a cylindrical or conical sealing surface 7 of the sealing ring 4 in order to provide a reliable seal. As above, the angle of taper W2 may be in the range of from 10° to 30°.

In addition, as shown in FIG. 1*a* the plastic tube 3 may be provided with an inert surface layer 19, for example of polytetrafluroethylene (PTFE) or some other inert material which prevents sticking or attack of the plastic tube 3 by an aggressive media being mixed.

Still further, the plastic tube 3 may be provided with an intentional weak point in the form of a longitudinal groove 21 so as to enable the plastic tube 3 to be readily separated after use and the mixing elements 11 to be removed.

In order to clean the static mixer, the connections 13 are loosened so that the end connections 5, 6 can be removed. Thereafter, the carrier and sealing rings 4 are pulled from the tubular housing 2 in order to enable access to the plastic tube 3 and the static mixers 11. At this time, the plastic tube 3 and mixer elements 11 may be slid out of the tubular housing 2 as a unit. The plastic tube 3 can then be split or otherwise separated from the mixer elements.

After cleaning, the individual mixer elements 11 can be slid into a fresh plastic tube 3 for re-assembly in the tubular housing 2.

The invention thus provides a static mixer which allows high processing speeds with reactive material at a high degree of constancy and with good reproducibility since the mixer can be readily cleaned and maintained.

The invention further provides a static mixer which can be disassembled and reassembled in a rapid easy manner. Further, by using a replaceable plastic tube, the life of the static mixer can be prolonged due to repeated reuses of the various permanent components of the mixer.

What is claimed is:

1. A static mixer comprising a pressure-tight, load bearing tubular housing;

an interchangeable plastic tube mounted coaxially in said housing and extending substantially the entire length of said housing;

at least one mixing element mounted in said plastic tube; and being slidable for insertion of said mixing element into said plastic tube; and a pair of rings, each ring being mounted at a respective end of said tubular housing having an outer annular surface in sealing contact with an inner annular surface of said plastic tube and an end surface in abutment with an end of a mixing element in said plastic tube and, wherein each ring has a flange opposite said end surface for abutting against an end of the tubular housing.

2. A static mixer as set forth in claim 1 which further comprises a pair of end connections, each connection being removably secured to a respective end of said housing and in abutment with the flange of a respective ring to secure said respective ring in place between said housing and said end connection and wherein each end connection abuts against the flange of the ring on the side opposite said housing.

3. A static mixer as set forth in claim 2 wherein a metal seal is formed between said ring and said end connection.

4. A static mixer as set forth in claim 1 wherein each ring is made of metal.

5. A static mixer as set forth in claim 1 wherein said annular surface is conical.

6. A static mixer as set forth in claim 5 wherein said annular surface has an angle of taper of from 10° to 30°.

7. A static mixer as set forth in claim 1 wherein said annular surface is roughened.

8. A static mixer as set forth in claim 1 wherein said annular surface has one of fluting and grooves therein.

9. A static mixer as set forth in claim 1 wherein said annular surface has a helical screw thread for threading into said plastic tube.

10. A static mixer as set forth in claim 9 wherein said screw thread is conical.

11. A static mixer as set forth in claim 1 wherein said plastic tube has conically tapered ends, each end having an angle of from 10° to 30°.

12. A static mixer as set forth in claim 1 wherein said plastic tube is made of a material selected from the group consisting of polyethylene and polypropylene.

13. A static mixer as set forth in claim 12 which further comprises an inert surface layer of polytetrafluroethylene on an interior surface of said plastic tube.

14. A static mixer as set forth in claim 1 wherein said plastic tube has a longitudinal groove therein to define a zone of weakening.

15. A static mixer as set forth in claim 1 wherein said mixing element has a plurality of crossing webs.

16. A static mixer comprising a pressure-tight load bearing tubular housing;

an interchangeable plastic tube mounted coaxially in said housing and extending substantially the entire length of said housing;

at least one mixing element mounted in said plastic tube; and being slidable for insertion of said mixing element into said plastic tube; and a ring removably mounted at the outlet end of said tubular housing having an outer annular surface in sealing contact with an inner annular surface of said plastic tube and an end surface in abutment with an end of said mixing element to retain said mixing element in said tube and wherein the ring has a flange opposite said end surface for abutting against the end of the tubular housing.

17. A static mixer as set forth in claim 16 which further comprises an end connector removably secured to said end of said tubular housing and in abutment with the flange of said ring to secure said ring in place between the housing and the end connection and wherein the end connection abuts against the flange of the ring on the side opposite the housing.

* * * * *